Nov. 26, 1968    D. J. GLADSTONE    3,412,990
COMPRESSION SPRINGS OF ELASTOMERIC MATERIAL
Filed July 14, 1966    2 Sheets-Sheet 1
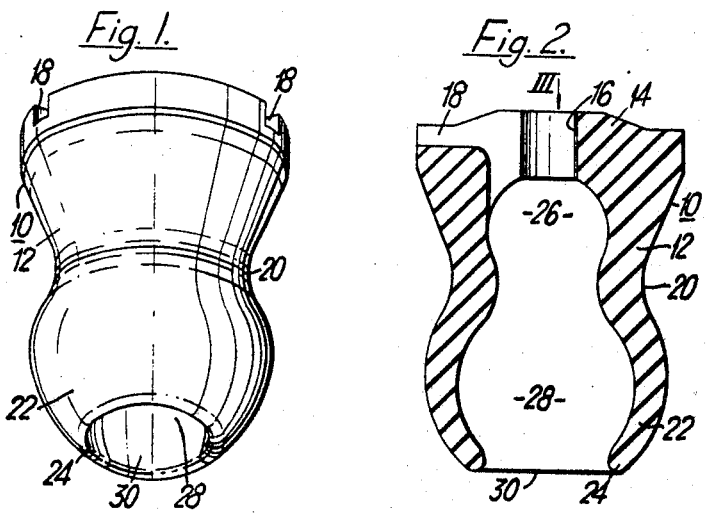
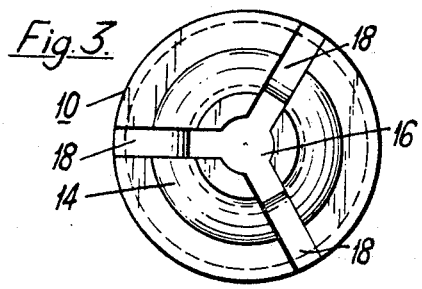
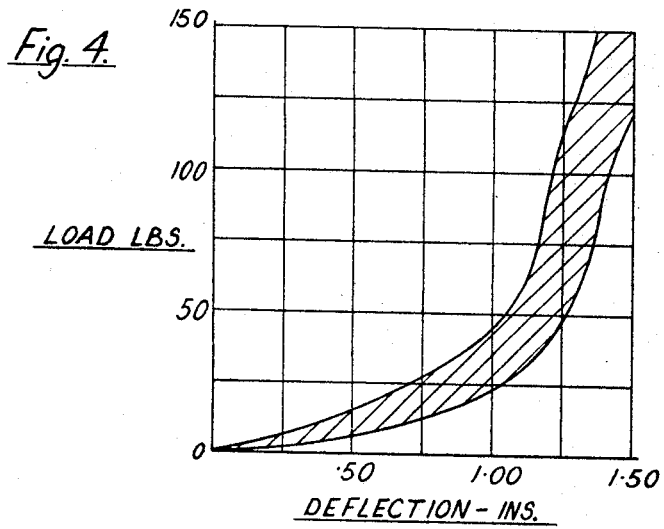
INVENTOR
Dennis John Gladstone
BY
J.C. Evans
ATTORNEY Nov. 26, 1968  D. J. GLADSTONE  3,412,990
COMPRESSION SPRINGS OF ELASTOMERIC MATERIAL
Filed July 14, 1966  2 Sheets-Sheet 2
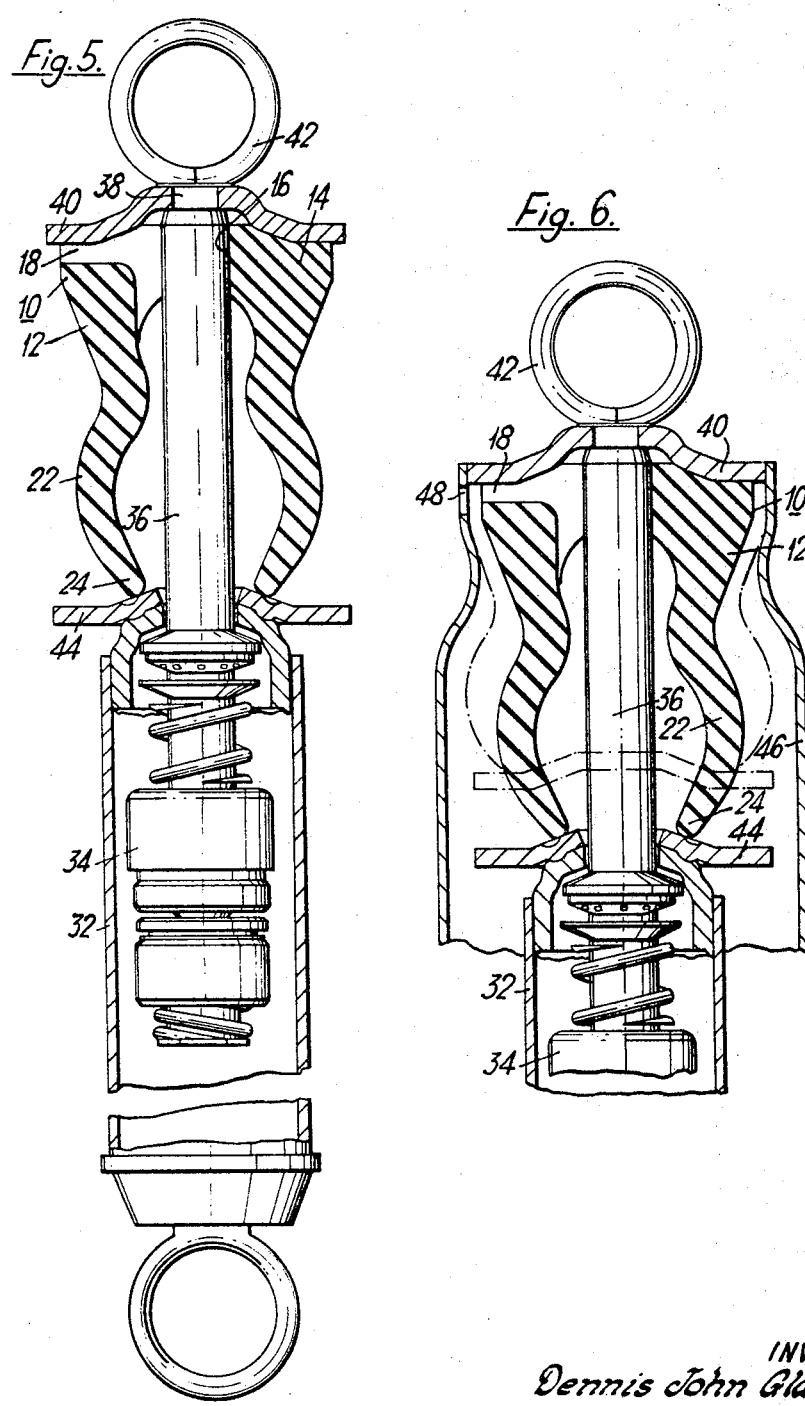
INVENTOR
Dennis John Gladstone
BY
J. C. Evans
ATTORNEY

United States Patent Office 3,412,990
Patented Nov. 26, 1968

3,412,990
COMPRESSION SPRINGS OF ELASTOMERIC MATERIAL
Dennis John Gladstone, Luton, England, assignor to General Motors Corporation, a corporation of Delaware
Filed July 14, 1966, Ser. No. 565,315
Claims priority, application Great Britain, July 21, 1965, 30,940/65
2 Claims. (Cl. 267—63)

ABSTRACT OF THE DISCLOSURE

A compression spring for shock absorbers made of elastomeric material being adapted to surround the shock absorber piston rod and to resist movement of the piston rod inwardly into the shock absorber during the compression stroke. A frusto-conically shaped base portion of the compression spring has a flat end adapted to be secured to an annular plate fastened to the piston rod. A lower convexly surfaced bulb portion with hollow interior combine to give the compression spring a two-stage deflection characteristic whereby initial axial deflections produce small compressive forces in the spring and larger axial deflections produce progressively greater spring compressive forces.

---

This invention relates to compression springs made of rubber or other elastomeric material, and to shock absorber assemblies incorporating such springs.

According to the invention, a compression spring comprises a hollow body of elastomeric material having a frusto-conically-surfaced base portion which at its wider end has a centrally apertured end wall and at its narrower end merges into a convexly surfaced bulb portion which terminates in an incurved lip.

The bulb portion of the compression spring may have a smaller wall thickness, as measured in a radial direction, than the base portion. Preferably the radial thickness of the wall of the hollow body decreases progressively from the wider end of the base portion to the terminal lip of the bulb portion.

The base portion of the compression spring may include one or more vent apertures. For example, three vent apertures spaced 120° apart may extend in a radial direction from the central aperture in the end wall to the exterior of the base portion.

The compression spring may form part of a motor vehicle suspension system. For this purpose, the elastomeric material of which the compression spring is made may be natural rubber having a hardness of 45–50 B.S. degrees. Alternatively the elastomeric material may be a butadiene-styrene elastomer.

The compression spring may be mounted on a piston rod of a telescopic shock absorber, for resilient engagement with a casing portion of the shock absorber.

According to the invention, therefore, from another aspect, a shock absorber assembly comprises a casing, a piston rod which projects from the casing and is telescopically movable relatively to the casing, a shock absorber piston fixed to the piston rod and movable within the casing by telescopic movement of the piston rod, and a compression spring as aforesaid mounted on the piston rod with the piston rod passing through the central aperture in the end wall of the spring, such that the incurved lip of the bulb portion of the compression spring resiliently engages a portion of the shock absorber casing during inward telescoping movement of the piston rod.

The incurved lip may be in resilient engagement with the casing portion in all axial positions of the piston rod. Alternatively, the incurved lip of the spring may be clear of the casing portion in the fully extended position of the piston rod, and engage the casing portion only at some intermediate position of the piston rod.

The compression spring may be seated on, and preferably bonded to, an annular disc which is secured to the piston rod, for example, at a location adjacent a fixing eye which is connected to the free end of the rod, for instance by projection welding.

The portion of the shock absorber casing which is resiliently engaged by the incurved lip of the compression spring during inward telescoping movement of the piston rod may comprise an annular disc which is secured to a cylindrical body portion of the casing. This annular disc may be of dished form.

The piston rod may also support a rigid tube, formed for example, as a conventional dust shield for the shock absorber, the internal surface of the tube being engaged during a compression stroke of the piston rod by at least the base portion of the compression spring. The rigid tube thereby limits bulging of the spring, so altering the spring gate.

The invention and how it can be performed is hereinafter particularly described with reference to the accompanying drawings, in which:

FIGURE 1 is a perspective of a preferred embodiment of a compression spring according to the present invention;
FIGURE 2 is a longitudinal section of the compression spring shown in FIGURE 1;
FIGURE 3 is an end view of the compression spring shown in FIGURE 2, in the direction of the arrow II in FIGURE 2;
FIGURE 4 is a load-deflection graph, with load in pounds plotted vertically against deflection in inches plotted horizontally, showing a shaded band representing a practical range of spring characteristics for the spring shown in FIGURE 1;
FIGURE 5 is a partial longitudinal section, with some parts in elevation, of one embodiment of a shock absorber assembly according to the invention, incorporating the spring shown in FIGURE 1; and
FIGURE 6 is a partial longitudinal section similar to FIGURE 5 but of another embodiment of a shock absorber assembly according to the invention in which a rigid tubular dust shield is progressively engaged by the base portion of the compression spring during a compression stroke, and thereby gives a spring rate different from that of the embodiment shown in FIGURE 4.

The compression spring which is shown in FIGURES 1 to 3 comprises a hollow annular body 10 which is made of natural rubber of a hardness of 45–50 B.S. degrees and is of generally thistle-head shape. In detail, the hollow body comprises a base portion 12 which has a frusto-conical outer surface and at its wider end has an end wall 14 formed with a central aperture 16 positioned axially of the spring. Three vent apertures 18 in the end wall are spaced 120° apart around the central aperture 16 and extend radially outwardly to the exterior of the base portion.

The narrower end of the frusto-conically-surfaced base portion 10 adjoins and merges smoothly, at a waist portion 20, into a bulb portion 22 which has a convex external surface which is shaped generally as a frustum of a sphere and terminates in a circular incurved lip 24.

The internal surface of the annular rubber spring is so shaped as to form two generally spherical cavities, a smaller one 26 of which is within the base portion of the spring and a somewhat larger one 28 of which is within the bulb portion; these two cavities 26 and 28 communicate with each other at the waist portion 20 of the spring. The hollow interior of the spring is in communication with the exterior at both axial ends, by means of an axial aperture 30 within the circular lip 24 at the bulb portion end of the spring, and by means of the vent apertures 18 and the central aperture 16 in the end wall at the base portion end of the spring.

The thickness of the wall of the hollow spring, as measured in a radial direction between the external and internal surfaces, decreases progressively from the wider end of the base portion to the terminal lip of the bulb portion.

The load-deflection characteristic of the spring shown in FIGURES 1 to 3 lies within the shaded band of the load-deflection graph shown in FIGURE 4. The spring thus has a two-stage characteristic, namely a gently rising initial portion followed by a steeply rising terminal portion.

The compression spring which has just been described may be mounted on a piston rod of a telescopic shock absorber, for resilient engagement with a casing portion of the shock absorber, and the resulting shock absorber assembly may form part of a motor vehicle suspension system. In the embodiment of such a shock absorber assembly which is shown in FIGURE 5, a cylindrical casing 32 surrounds a shock absorber piston 34 which is telescopically movable in an axial direction within the casing, and a piston rod 36 to which the piston is fixed projects from one axial end of the casing. The free end of the piston rod has a reduced-diameter portion 38 on which is mounted a dished annular disc 40; a rubber compression spring 10 as already described is mounted on the piston rod 36 with the piston rod passing through the central aperture 16 in the end wall 14, the end wall being bonded to the concave surface of the dished annular disc. A metal fixing eye 42 is projection-welded to the convex surface of the dished annular disc, and also to the free end surface of the piston rod, which is flush with the convex surface of the disc.

In the fully extended position of the piston rod 36, the incurved lip 24 of the rubber compression spring 10 is just in resilient engagement with a dished annular disc 44 which is secured to an end face of the shock absorber casing 32 to form a substantially radially-extending flange portion of the casing. The parts of the shock absorber within the cylindrical casing 32 are parts conventionally used in a telescopic shock absorber to give a hydraulic damping action during reciprocatory movement of the piston rod, and will not be further described.

The function of the rubber compression spring 10 in the shock absorber assembly is to resiliently oppose inward movement of the piston rod with a two-stage action. From the fully extended position of the piston rod 36, inward movement of the piston rod causes the rubber spring to be compressed between the dished annular discs 40 and 44; in a first increment of movement of the piston rod the bulb portion 22 of the spring deforms, giving a low spring rate (low load-deflection ratio), whereas further movement involves deformation of the relatively thick-walled base portion 12 of the spring, so giving a higher spring rate, with the spring rate increasing rapidly in a progressive manner with increasing piston rod displacement. During deformation of the spring, air escapes from the hollow interior through the vent apertures 18.

The embodiment of the shock absorber assembly according to the invention which is shown in FIGURE 6 is for the most part identical with the embodiment shown in FIGURE 5, and like parts are denoted by like reference numerals. However, the embodiment shown in FIGURE 6 additionally includes a rigid tube 46 which is fixed to the annular disc 40, and hence supported by the piston rod 36 of the shock absorber, and forms a dust shield for the shock absorber. Apertures 48 in the tube allow communication at all times between the vent apertures 18 and the exterior of the tube. With the piston rod in its extended position, there is a clearance between the rigid tube 48 and the spring 10, which has the shape shown in full lines. During a compression stroke of the piston rod, the base portion 12 of the spring 10 engages the internal surface of the tube 48, as shown in interrupted lines in FIGURE 6, whereby bulging of the spring is limited and the spring rate is decreased, so increasing the effective stiffness of the spring (in other words, giving an increased steepness at this part of the load-deflection curve).

The two-stage characteristic given by the compression spring according to the invention is very useful in a motor vehicle suspension system, since small bump movements of a road wheel can be resiliently resisted in a gentle manner, whereas violent bump movements can be resisted progressively more firmly. Compression springs according to the invention can thus be used to supplement the action of conventional main springs of a motor vehicle suspension system, for giving a progressively variable spring characteristic to the system.

I claim:

1. A shock absorber assembly comprising a casing having an end portion, a piston rod which projects from the casing and is telescopically movable relative to the casing, an annular disc on said rod, a shock absorber piston fixed to the piston rod and movable within the casing by telescopic movement of the piston rod, a compression spring of elastomeric material having a frusto-conically-surfaced hollow base portion, a wider end on said base portion having a centrally apertured end wall, a narrower end on said base portion, a convexly-surfaced hollow bulb portion joined to said narrower end, an inwardly curved lip on said bulb portion, the radial wall thickness of said compression spring decreasing from said base portion to said inwardly curved lip, said base portion of the compression spring engaging said annular disk, the compression spring being mounted on said piston rod with the piston rod passing through said central aperture in said end wall, said inwardly curved lip of the bulb portion of the compression spring resiliently engaging said end portion of said casing during inwardly telescoping movement of said piston rod, said bulb portion bulging radially outwardly during a first predetermined inward movement of said piston rod to produce small compression forces resisting such initial movement, said frusto-conically-surfaced base portion deforming upon a further inward movement of said piston rod to produce greater compression for resisting such further inward movements.

2. A shock absorber assembly comprising a casing having an end portion, a piston rod which projects from the casing and is telescopically movable relative to the casing, an annular disc on said rod, a shock absorber piston fixed to the piston rod and movable within the casing by telescopic movement of the piston rod, a compression spring of elastomeric material having a frusto-conically-surfaced hollow base portion, a wider end on said base portion having a centrally apertured end wall, a narrower end on said base portion, a convexly-surfaced hollow bulb portion joined to said narrower end, an inwardly curved lip on said bulb portion, the radial wall thickness of said compression spring decreasing from said base portion to said inwardly curved lip, said base portion of the compression spring engaging said annular disk, the compression spring being mounted on said piston rod with the piston rod passing through the central aperture in said end wall, said inwardly curved lip of the bulb portion of the compression spring resiliently engaging said end portion of said casing during inwardly telescopic movement of said piston rod, and whereby the deflection characteristics of the compression spring are characterized by initially low compression forces produced by large axially inward movements of said piston rod followed by greater compression forces produced on decreasing axially inward movements of said piston rod, a rigid tube on said piston rod defining a dust shield for the shock absorber, said tube coaxially surrounding the compression spring, an internal surface on said rigid tube contoured to match the frusto-conically-surfaced base portion and the convexly-surfaced bulb portion of the compression spring, said internal surface being engaged by said base portion to control radial deformation of said spring.

References Cited

UNITED STATES PATENTS

| 2,981,534 | 4/1961 | Peras | 267—35 X |
| 3,082,998 | 3/1963 | Lange | 267—35 X |

FOREIGN PATENTS

| 1,328,000 | 4/1963 | France. |
| 1,103,775 | 3/1961 | Germany. |
| 625,441 | 9/1961 | Italy. |

MILTON BUCHLER, *Primary Examiner.*

GEORGE E. HALVOSA, *Assistant Examiner.*